United States Patent
Tsai et al.

(10) Patent No.: US 8,199,690 B2
(45) Date of Patent: Jun. 12, 2012

(54) RELAY STATION, TRANSMISSION METHOD, AND TANGIBLE MACHINE-READABLE MEDIUM THEREOF FOR USE IN A MULTI-HOP NETWORK

(75) Inventors: Yi-Hsueh Tsai, Ban-Chiao (TW); Chih-Chiang Hsieh, Jen-Wu Township, Kaohsiung County (TW); Kan-Chei Loa, Taipei (TW)

(73) Assignee: Institute for Information Industry, Taipei (TW)

( * ) Notice: Subject to any disclaimer, the term of this patent is extended or adjusted under 35 U.S.C. 154(b) by 833 days.

(21) Appl. No.: 11/955,960

(22) Filed: Dec. 13, 2007

(65) Prior Publication Data

US 2008/0247350 A1 Oct. 9, 2008

Related U.S. Application Data

(60) Provisional application No. 60/910,376, filed on Apr. 5, 2007.

(51) Int. Cl.
  *H04J 1/10* (2006.01)
(52) U.S. Cl. .......................................... 370/315; 370/322
(58) Field of Classification Search ........................ None
See application file for complete search history.

(56) References Cited

U.S. PATENT DOCUMENTS

| 6,965,568 | B1 | 11/2005 | Larsen | |
|---|---|---|---|---|
| 6,981,088 | B2 | 12/2005 | Holm et al. | |
| 7,630,355 | B2 * | 12/2009 | Tao et al. | 370/343 |
| 7,693,096 | B2 * | 4/2010 | Lim et al. | 370/310 |
| 2006/0029011 | A1 * | 2/2006 | Etemad et al. | 370/311 |
| 2006/0153112 | A1 | 7/2006 | Lim et al. | |
| 2007/0206561 | A1 * | 9/2007 | Son et al. | 370/346 |
| 2008/0084856 | A1 * | 4/2008 | Ramachandran | 370/342 |
| 2008/0095097 | A1 * | 4/2008 | Mehta et al. | 370/328 |
| 2008/0247488 | A1 * | 10/2008 | Li et al. | 375/299 |
| 2008/0267104 | A1 * | 10/2008 | Zhang | 370/311 |

OTHER PUBLICATIONS

Tao, Zhifeng, et al., "Aggregation and Concatenation in IEEE 802.16j Mobile Multihop Relay (MMR) Networks," *IEEE Mobile WiMAX Symposium*, Mar. 25-29, 2007, pp. 85-90.

* cited by examiner

*Primary Examiner* — Bunjob Jaroenchonwanit (74) *Attorney, Agent, or Firm* — Patterson Thuente Christensen Pedersen, P.A.

(57) ABSTRACT

A relay station, a transmission method, and a tangible machine-readable medium thereof for use in a multi-hop network are provided. The relay station comprises a receiving module, a decoding module, and a transmission module. The receiving module is configured to receive a frame, the frame comprising an extended information element corresponding to the relay station. The decoding module is configured to decode the extended information element to derive at least one message. The transmission module is configured to transmit a burst according to the at least one message.

15 Claims, 7 Drawing Sheets

RELAY STATION, TRANSMISSION METHOD, AND TANGIBLE MACHINE-READABLE MEDIUM THEREOF FOR USE IN A MULTI-HOP NETWORK

This application claims the benefit of priority based on U.S. Provisional Application No. 60/910,376 filed on Apr. 5, 2007, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a relay station, a transmission method, and a tangible machine-readable medium thereof for use in a multi-hop network. More specifically, the present invention relates to a relay station, a transmission method, and a tangible machine-readable medium thereof for use in a multi-hop network based on the IEEE 802.16j standard.

2. Descriptions of the Related Art

Figure 1A:
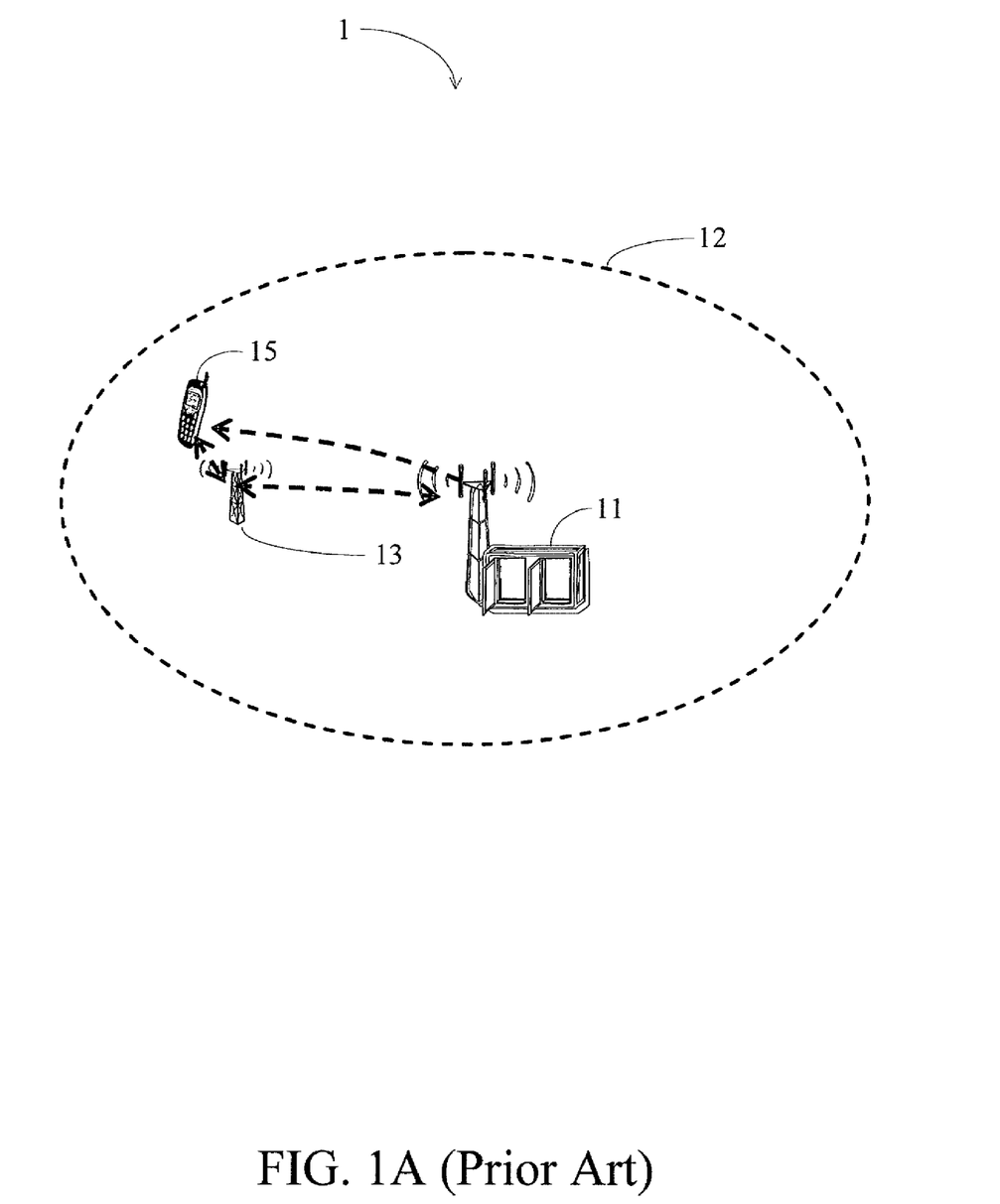
FIG. 1A is a schematic diagram of the multi-hop relay system.

The IEEE 802.16j standard provides two kinds of relay modes: transparent relay and non-transparent relay modes. A relay station (RS) conforming to the IEEE 802.16j standard works in one mode at a time. FIG. 1A illustrates a multi-hop relay system 1 conforming to the IEEE 802.16j standard, wherein the multi-hop relay system 1 comprises a multi-hop relay base station (MR-BS) 11, a relay station (RS) 13, and a mobile station (MS) 15. The multi-hop relay system 1 operates in the transparent mode, that is, the MS 15 associated to the RS 13 is located within the coverage 12 of the MR-BS 11.

Figure 1B:
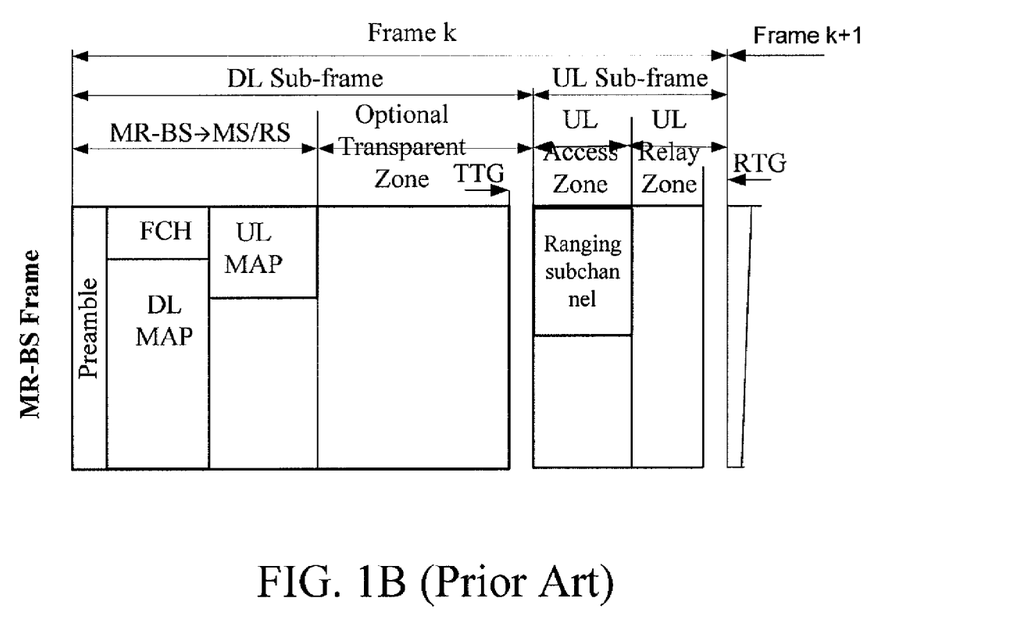
FIG. 1B is a schematic diagram of a frame structure of the IEEE 802.16j standard.

FIG. 1B illustrates a frame structure of the IEEE 802.16j standard. When the MR-BS 11 intends to transmit data to the MS 15, it has to allocate resources in the downlink (DL) MAP in a frame. After that, the MR-BS 11 transmits the data to the MS 15 in a burst of this or the next frame according to the DL MAP. On the other hand, the MR-BS 11 can allocate resources in the uplink (UL) MAP in a frame as well. Then, the MS 15 can transmit to the MR-BS 11 in a burst of this or the next frame according to the UL MAP.

In the transparent mode, the MR-BS 11 transmits data and a control signal through different paths to the MS 15. To be more specific, the control signal, i.e. both the DL MAP and UL MAP is directly transmitted from the MR-BS 11 to the MS 15 without the relay of the RS 13, while the data is transmitted from the MR-BS 11 to the MS 15 with the relay of the RS 13. All the MS 15 and the RS 13 within the coverage 12 are synchronized to the MR-BS 11 according to the preamble in a frame issued by the MR-BS 11 and then get the DL MAP and UL MAP.

However, some problems will occur when a new RS intends to join the multi-hop relay system 1. First, the new RS has to support the aforementioned UL/DL data relay. Second, since the joining of the new RS provides additional paths to the existing MS, the MR-BS 11 and the new RS have to support routing path management. Third, broadcast and multicast of DL data have to be achieved in a more efficient way. Consequently, a solution to the problems is still an objective for the industry to endeavor.

SUMMARY OF THE INVENTION

The primary objective of this invention is to provide a relay station for use in a multi-hop network. The relay station comprises a receiving module, a decoding module, and a transmission module. The receiving module is configured to receive a frame, the frame comprising an extended information element corresponding to the relay station. The decoding module is configured to decode the extended information element to derive at least one message. The transmission module is configured to transmit a burst according to the at least one message.

Another objective of this invention is to provide a transmission method for a relay station in a multi-hop network. The transmission method comprises the steps of: receiving a frame, the frame comprising an extended information element corresponding to the relay station; decoding the extended information element to derive at least one message; and transmitting a burst according to the at least one message.

Yet a further objective of this invention is to provide a tangible machine-readable medium storing a computer program to enable a relay station to execute a transmission method for use in a multi-hop network. The transmission method comprises the steps of: enabling the relay station to receive a frame, the frame comprising an extended information element corresponding to the relay station; enabling the relay station to decode the extended information element to derive at least one message; and enabling the relay station to transmit a burst according to the at least one message.

The present invention can relay a burst according to messages in the extended information element, wherein the extended information element is attached in a reserved field of an original information element of the frame based on the IEEE 802.16 standard. The extended information element is only decoded by a specific relay station. By this operation, the relay station is not necessary to refer to MAPs generated by the MR-BS. By the arrangement, a base station can assist relay stations in scheduling data routing paths. Furthermore, relay stations can relay sub-bursts to mobile stations according to the message without the processing of the protocol data unit of the burst.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 2A:
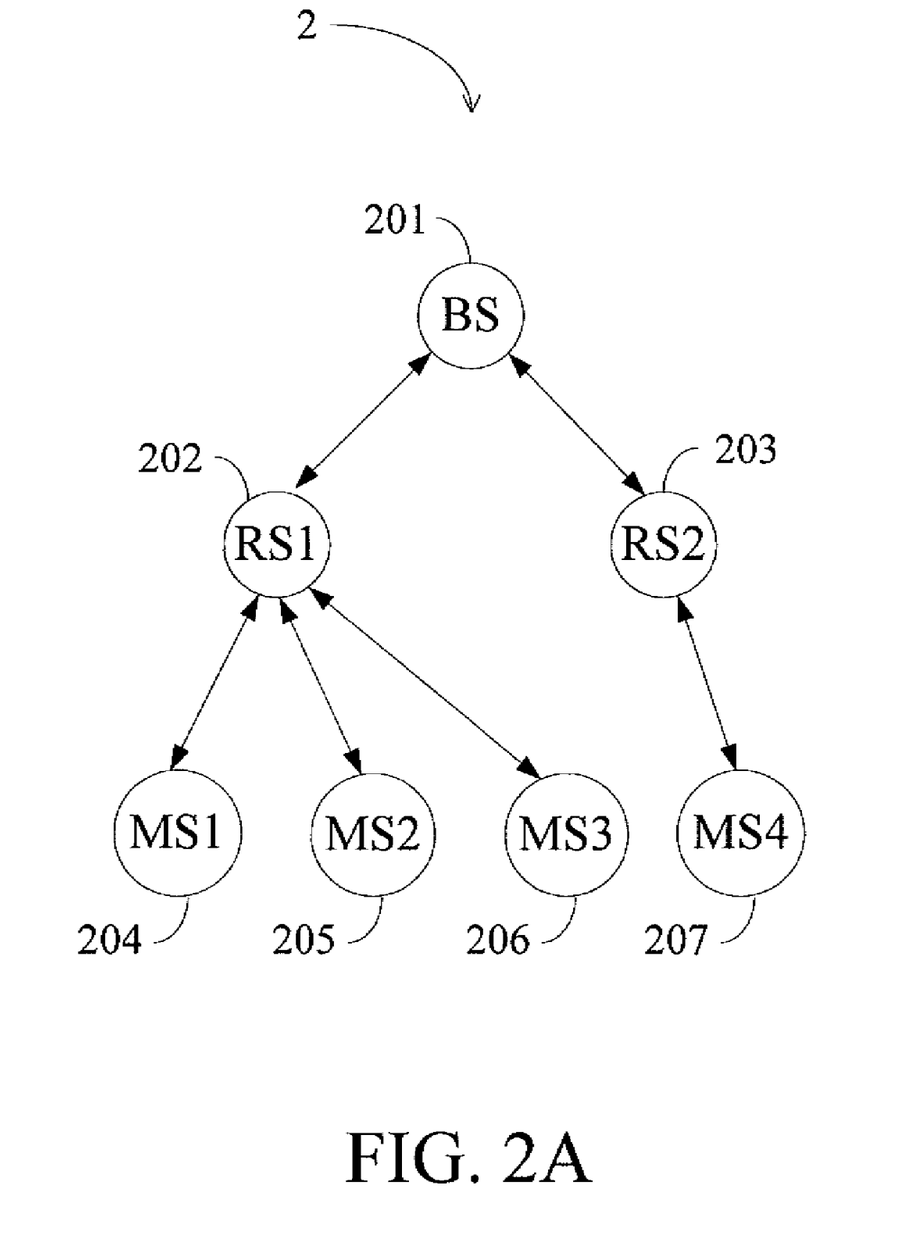
FIG. 2A is a schematic diagram of the first embodiment of the present invention.

A first embodiment of the invention is shown in FIG. 2A, which is a multi-hop network 2 conforming to the IEEE 802.16j standard. The multi-hop network 2 comprises a BS 201, two relay stations denoted as RS1 202 and RS2 203, and four mobile stations denoted as MS1 204, MS2 205, MS3 206, and MS4 207. The transmissions of frames between them are described later. The relay station RS1 202, shown in FIG. 2B, comprises a receiving module 21, a decoding module 23, a transmission module 25, and a dividing module 27. The RS2 203 comprises the same modules as well.

The BS 201 intends to transmit some data to the MS1 204, MS2 205, and MS3 206 through the RS1 202 and intends to transmit some other data to the MS4 207 through the RS2 203. Since the multi-hop network 2 conforms to the IEEE 802.16j standard, the BS 201 has to allocate resources for the RS1 202, RS2 203, MS1 204, MS2 205, MS3 206, and MS4 207 in the DL-MAP of a frame first. After the frame is received by the RS1 202, RS2 203, MS1 204, MS2 205, MS3 206, and MS4 207, the multi-hop network 2 transmits and receives data in this or the next frame according to the DL-MAP.

To be more specific, the BS 201 allocates a plurality of information elements (IEs) in the DL-MAP for the RS1 202. The information element (IE) is the syntax defined in the IEEE 802.16j standard, so the details are not described here. In this embodiment, the BS 201 takes advantages of a DL-MAP IE, one of the reserved DL-MAP Extended IEs or DL-MAP Extended-2 IEs. Since it is the reserved field, it is considered as the extended information element in this embodiment. The BS 201 uses the DL-MAP IE (ex. DL-MAP Extended IE) to indicate the RS1 202 that it should decode or correspondingly process (such as relaying the IEs to where they should go) the coming IEs. Furthermore, the BS 201 also informs the RS1 202 how to divide a burst in the DL-MAP IE, wherein the burst comprises the data that the BS 201 intends to transmit to the MS1 204, MS2 205, and MS3 206. For example, the BS 201 may use the lengths to describe which part of the data to be transmitted to which MS. The BS 201 does the same for the RS2 203.

Figure 3:
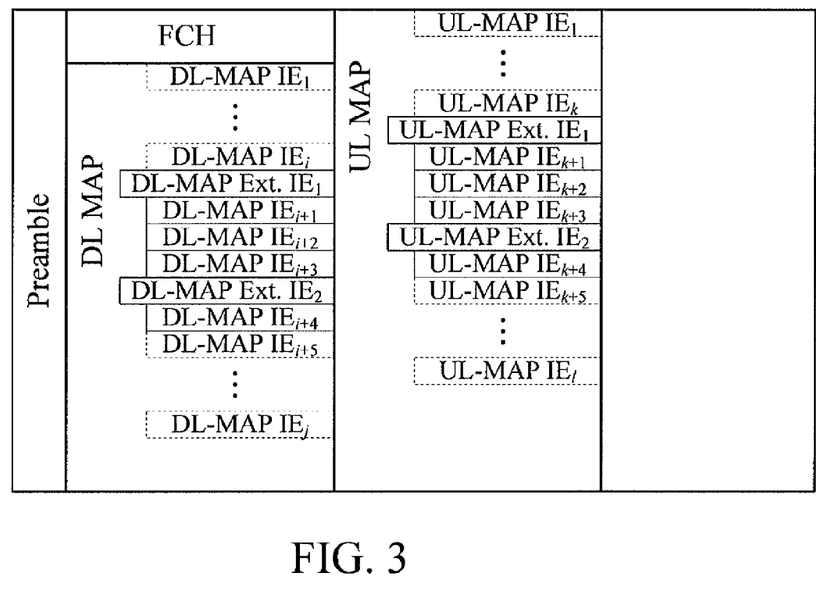
FIG. 3 is a schematic diagram of the frame structure based on the IEEE 802.16j.

After the BS 201 allocates resources according to the aforementioned approaches, the RS1 202, RS2 203, MS1 204, MS2 205, MS3 206, and MS4 207 receives the frame. Since the frame is transmitted from the BS 201, it comprises the aforementioned extended information element, i.e. DL-MAP Extended IE, corresponding to the RS1 202 and RS2 203. More particularly, please refer to FIG. 3 which is a schematic diagram of the received frame structure, wherein the meanings of the preamble, frame control header (FCH), uplink map (UL-MAP), and downlink map (DL-MAP) are well-known by people skilled in the art and not repeated again. The DL-MAP Ext. $IE_1$ and the DL-MAP Ext. $IE_2$ shown in FIG. 3 are the extended information element for the RS1 202 and RS2 203, respectively. As mentioned, the DL-MAP Ext. IE and the DL-MAP Ext. $IE_2$ are attached in the reserved field of the original information element (IE) of the frame.

The DL-MAP Ext. $IE_1$ is configured to inform the RS1 202 how the resources and schedules in the multi-hop network are allocated and arranged. To be more specific, after the frame is received by the receiving module 21 of RS1 202, the decoding module 23 of the RS1 202 decodes the DL-MAP Ext. $IE_1$ to derive at least one message which is configured to let the RS1 202 know how the resources and schedules in the multi-hop network are allocated and arranged. The information elements DL-MAP-$_{i+1}$, DL-MAP-IE$_{i+2}$, and DL-MAP-IE$_{i+3}$ shown in FIG. 3 are the ones that the RS1 202 should process. Similarly, the DL-MAP Ext. $IE_2$ is configured to inform the RS2 203 and the DL-MAP-IE$_{i+4}$ is the information element that the RS2 203 should process.

Figure 2B:
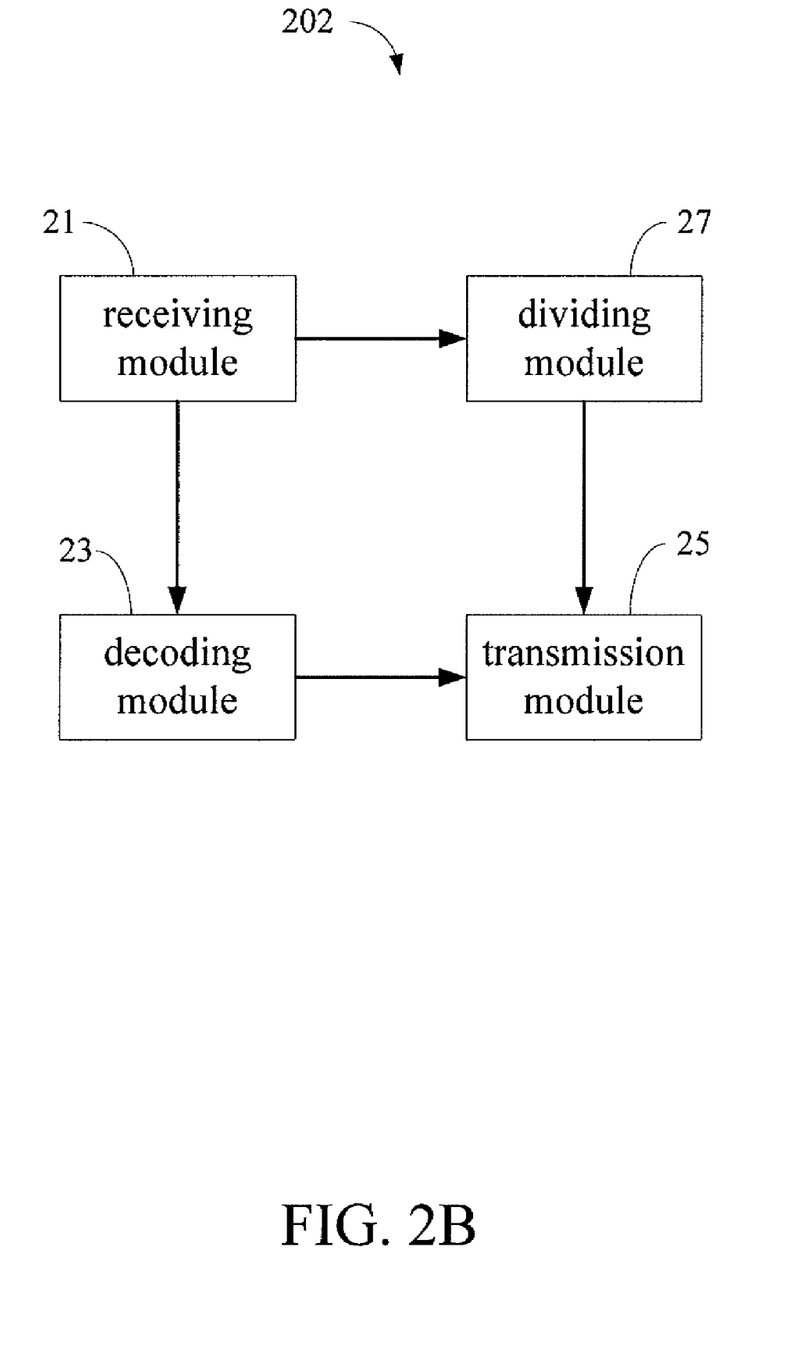
FIG. 2B is a schematic diagram of an RS of the first embodiment.

When this or a next frame is received by the receiving module 21 of the RS1 202, the dividing module 27 divides the burst in the frame into a plurality of sub-bursts according to the message derived from the extended information element, i.e. the DL-MAP Ext. $IE_1$. Each of the sub-bursts corresponds to one of the MS1 204, MS2 205, and MS3 206. The transmission module 25 further transmits the sub-bursts to the MS1 204, MS2 205, and MS3 206 according to the message. The RS2 203 will perform similar operations.

On the other hand, when the MS1 204, MS2 205, MS3 206, and/or MS4 207 needs to transmit data to the base station 201, the base station 201 allocates resources in the UL-MAP in a frame first. Then, the RS1 202, the RS2 203, the MS1 204, MS2 205, MS3 206, and/or MS4 207 may perform similar operations as the ones described in the downlink case.

According to the above configurations, the relay station of the present invention can know how to relay data, such as a frame, a burst, or a sub-burst, according to an extended information element in the MAP in the multi-hop network. By the present invention, a base station can assist relay stations in scheduling data routing paths. Furthermore, relay stations can relay sub-bursts to mobile stations according to the message without the processing of the protocol data unit of the burst.

Figure 4:
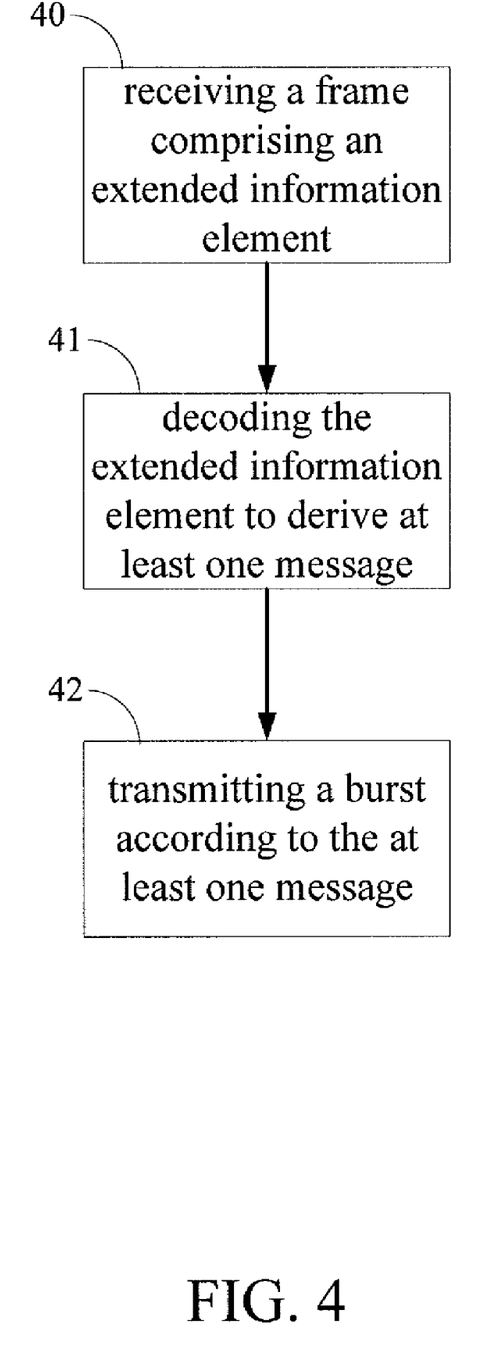
FIG. 4 is a flow chart of the second embodiment of the present invention.

A second embodiment of the invention is shown in FIG. 4, which is a flow chart of a transmission method for a relay station in a multi-hop relay network. First, step 40 is executed to receive a frame comprising an extended information element corresponding to the relay station. Step 41 is then executed to decode the extended information element to derive at least one message. Finally, step 42 is executed to transmitting a burst of the frame according to the at least one message.

In particular, the multi-hop relay network conforms to the IEEE 802.16 standard, and the frame received in step 40 comprises an MAP and the burst, and the MAP comprises the information element, wherein the MAP is one of a DL-MAP and a UL-MAP. The extended information element is attached in a reserved field of the information element of the frame. The frame is generated by a base station in the multi-hop network. The at least one message derived in step 41 is configured to indicate how to relay data in the multi-hop network so that the burst of the frame is transmitted according to the at least one message in step 42.

Figure 5:
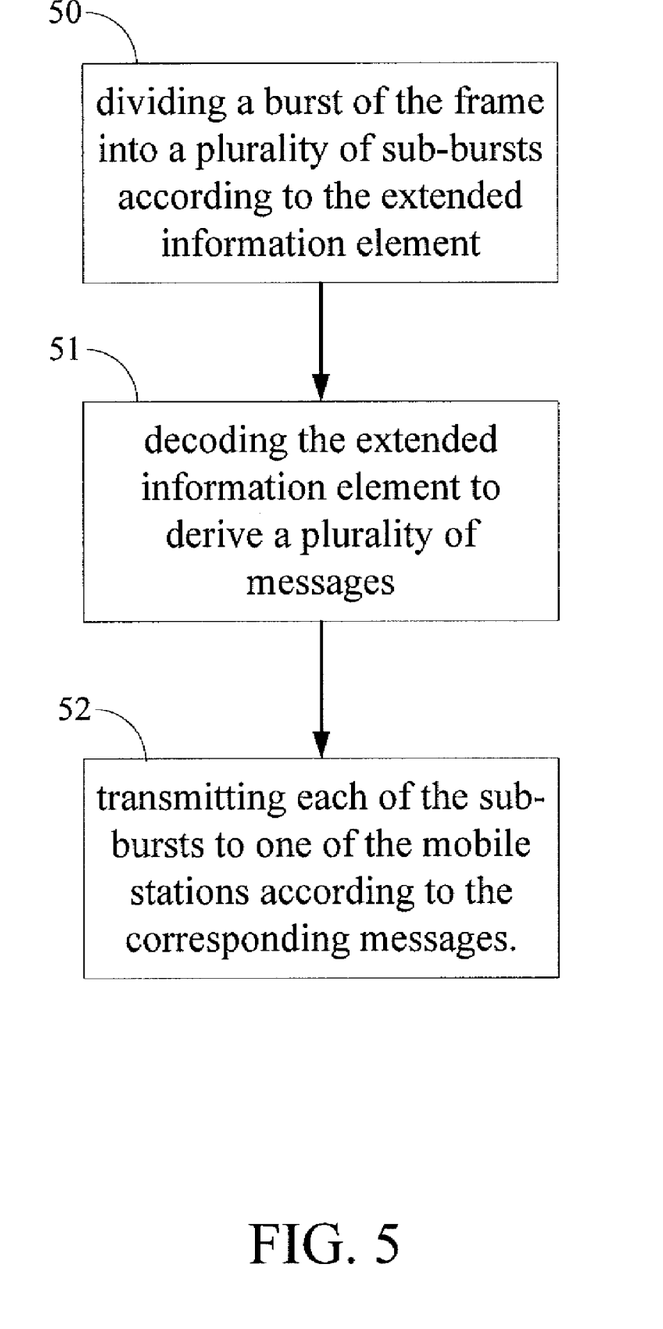
FIG. 5 is an alternative flow chart of step 41 and 42 of the second embodiment.

In addition, please refer to FIG. 5, step 41 and 42 can be replaced by step 50 to 52 if the multi-hop network has a plurality of mobile stations. First step 50 is executed to divide the burst into a plurality of sub-bursts according to the extended information element. Step 51 is executed to decode the extended information element to derive a plurality of messages. Finally, step 52 is executed to transmit each of the sub-bursts to one of the mobile stations according to the corresponding messages.

In addition to the aforementioned steps, the second embodiment may perform all the operations and functions described in the first embodiment.

Each of the aforementioned methods can use a tangible machine-readable medium for storing a computer program to execute the aforementioned steps. The tangible machine-readable medium can be a floppy disk, a hard disk, an optical disc, a flash disk, a tape, a database accessible from a network or a storage medium with the same functionality that can be easily thought by people skilled in the art.

According to the aforementioned descriptions, the present invention proposes an extended information element in an original frame based on the IEEE 802.16j standard to achieve the multi-hop relay. The MR-BS/MS builds the extended information element and inserts it into the frame. The RS relays the burst to the MR-BS, MS, or RS according to the extended information element. By the present invention, a base station can assist relay stations in scheduling data routing paths. Furthermore, relay stations can relay sub-bursts to mobile stations according to the message without the processing of the protocol data unit of the burst.

The above disclosure is related to the detailed technical contents and inventive features thereof. People skilled in this field may proceed with a variety of modifications and replacements based on the disclosures and suggestions of the invention as described without departing from the characteristics thereof Nevertheless, although such modifications and replacements are not fully disclosed in the above descriptions, they have substantially been covered in the following claims as appended.

What is claimed is:

1. A relay station for use in a multi-hop network, the multi-hop network conforming to the IEEE 802.16j standard and comprising a base station, a mobile station and the relay station, the relay station comprising:
    a receiving device being configured to receive a frame from the base station, the frame comprising an MAP, the MAP comprising an extended information element corresponding to the relay station, the extended information element being configured to inform the relay station how resources and schedules in the multi-hop network are allocated and arranged for the relay station;
    a decoding device being electrically connected to the receiving device and configured to decode the extended information element to derive at least one message, the at least one message being an information element coming right after the extended information element in the MAP and being configured to let the relay station know how the resource and schedules in the multi-hop network are allocated and arranged for the relay station; and
    a transmission device being electronically connected to the decoding device and configured to transmit a burst to the mobile station according to the at least one message.

2. The relay station of claim 1, wherein the multi-hop network comprises a plurality of mobile stations and the relay station further comprises:
    a dividing device being electrically connected to the receiving device and the transmission device and configured to divide the burst into a plurality of sub-bursts according to the extended information element;
    wherein the decoding device decodes the extended information element to derive a plurality of messages and the transmission device is further configured to transmit each of the sub-bursts to one of the mobile stations according to the corresponding messages.

3. The relay station of claim 2, wherein the extended information element is attached in a reserved field of an original information element of the frame.

4. The relay station of claim 1, wherein the MAP is one of a DL-MAP and an UL-MAP.

5. The relay station of claim 1, wherein the frame is generated by a base station in the multi-hop network.

6. A transmission method for a relay station in a multi-hop network, the multi-hop network conforming to the IEEE 802.16j standard and comprising a base station, a mobile station and the relay station, the transmission method comprising the steps of:
    enabling a receiving device of the relay station to receive a frame from the base station, the frame comprising an MAP, the MAP comprising an extended information element corresponding to the relay station, the extended information element being configured to inform the relay station how resources and schedules in the multi-hop network are allocated and arranged for the relay station;
    enabling a decoding device of the relay station to decode the extended information element to derive at least one message, the at least one message being an information element coming right after the extended information element in the MAP and being configured to let the relay station know how the resources and schedules in the multi-hop network are allocated and arranged for the relay station; and
    enabling a transmission device of the relay station to transmit a burst to the mobile station according to the at least one message.

7. The transmission method of claim 6, wherein the multi-hop network comprises a plurality of mobile stations, and the transmission method further comprises the step of:
    enabling a dividing device of the relay station to divide the burst into a plurality of sub-bursts according to the extended information element;
    wherein the decoding step enables the decoding device to decode the extended information element to derive a plurality of messages and the transmitting step enables the transmission device to transmit each of the sub-bursts to one of the mobile stations according to the corresponding messages.

8. The transmission method of claim 7, wherein the extended information element is attached in a reserved field of an original information element of the frame.

9. The transmission method of claim 6, wherein the MAP is one of a DL-MAP and a UL-MAP.

10. The transmission method of claim 6, wherein the frame is generated by a base station in the multi-hop network.

11. A non transitory medium storing a computer program to enable a relay station to execute a transmission method for use in a multi-hop network, the multi-hop network conforming to the IEEE 802.16j standard and comprising a base station, a mobile station and the relay station, the transmission method comprising the steps of:
    enabling the relay station to receive a frame from the base station, the frame comprising an MAP, the MAP comprising an extended information element corresponding to the relay station, the extended information element being configured to inform the relay station how resources and schedules in the multi-hop network are allocated and arranged for the relay station;
    enabling the relay station to decode the extended information element to derive at least one message, the at least one message being an information element coming right after the extended information element in the MAP and being configured to let the relay station know how the resource and schedules in the multi-hop network are allocated and arranged for the relay station; and
    enabling the relay station to transmit a burst to the mobile station according to the at least one message.

12. The non transitory medium of claim 11, wherein the multi-hop network comprises a plurality of mobile stations, and the transmission method further comprises the step of:
    dividing the burst into a plurality of sub-bursts according to the extended information element;
    wherein the decoding step decodes the extended information element to derive a plurality of messages and the transmitting step transmits each of the sub-bursts to one of the mobile stations according to the corresponding messages.

13. The non transitory medium of claim 12, wherein the extended information element is attached in a reserved field of an original information element of the frame.

14. The non transitory medium of claim 11, wherein the MAP is one of a DL-MAP and a UL-MAP.

15. The non transitory medium of claim 11, wherein the frame is generated by a base station in the multi-hop network.

* * * * *